No. 698,522. Patented Apr. 29, 1902.
H. W. KOEHLER.
RUNNING GEAR FOR VEHICLES.
(Application filed Feb. 15, 1901.)
(No Model.) 2 Sheets—Sheet 1.
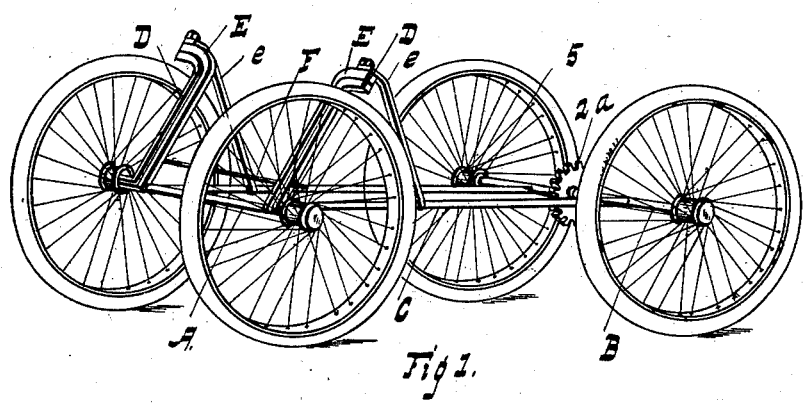
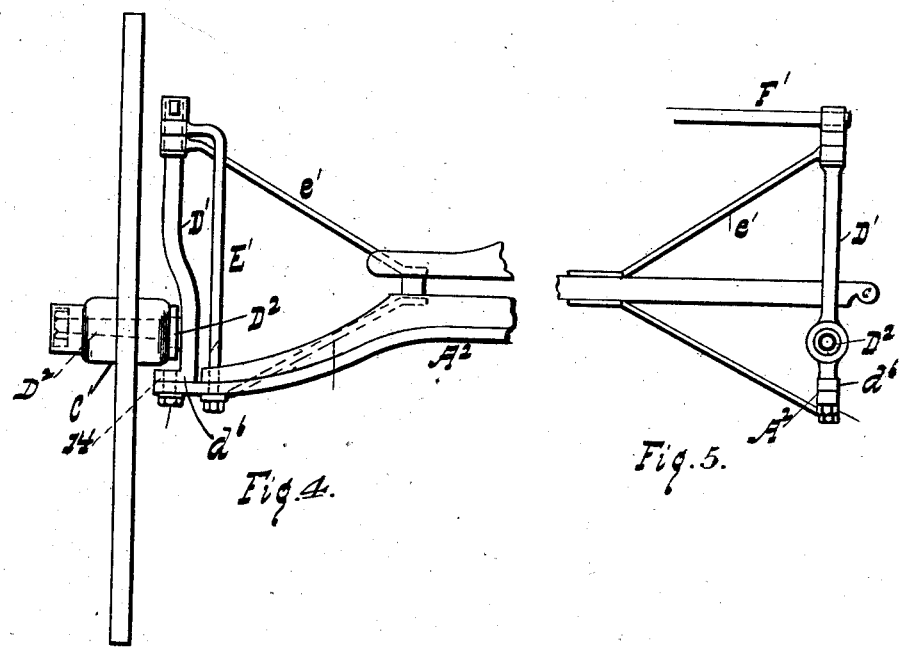
WITNESSES
T. S. Massey.
R. M. Parker.
INVENTOR
Henry W. Koehler
By Parker & Burton,
Attorneys.

No. 698,522. Patented Apr. 29, 1902.
H. W. KOEHLER.
RUNNING GEAR FOR VEHICLES.
(Application filed Feb. 15, 1901.)
(No Model.) 2 Sheets—Sheet 2.
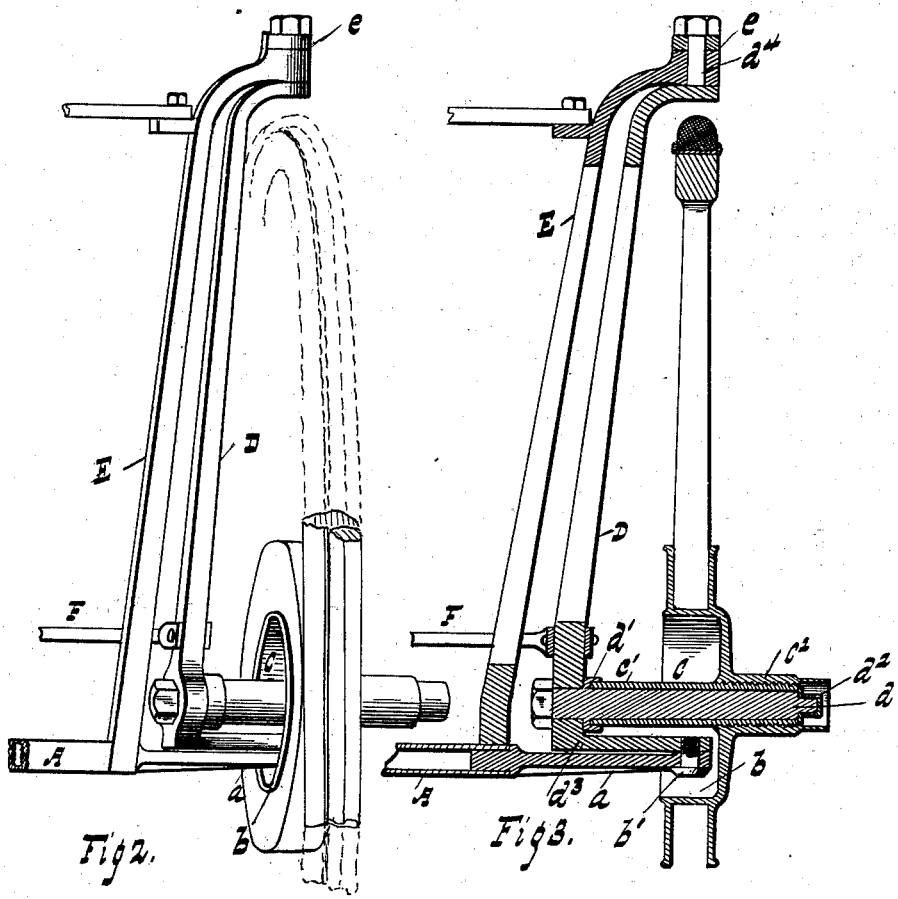
WITNESSES
INVENTOR
Henry W. Koehler
By Parker & Burton,
Attorneys.

UNITED STATES PATENT OFFICE.

HENRY W. KOEHLER, OF DETROIT, MICHIGAN.

RUNNING-GEAR FOR VEHICLES.

SPECIFICATION forming part of Letters Patent No. 698,522, dated April 29, 1902.

Application filed February 15, 1901. Serial No. 47,397. (No model.)

*To all whom it may concern:*

Be it known that I, HENRY W. KOEHLER, a citizen of the United States, residing at Detroit, county of Wayne, State of Michigan, have invented a certain new and useful Improvement in Running-Gear for Vehicles; and I declare the following to be a full, clear, and exact description of the invention, such as will enable others skilled in the art to which it pertains to make and use the same, reference being had to the accompanying drawings, which form a part of this specification.

This invention relates to running-gear for vehicles, and has for its object an improved gear comprising a means for turning the front wheels to change the course of the vehicle.

In the drawings, Figure 1 is a perspective showing the arrangement of the combined parts. Fig. 2 is a perspective showing the details of a front wheel and its connection with the axle. Fig. 3 is a sectional elevation of the parts shown in Fig. 2. Fig. 4 shows an ordinary wooden-hubbed wheel held by a spindle pivoted to the cross-bar of the axle. Fig. 5 is a side elevation of the parts shown in Fig. 4, the wheel being removed.

The invention comprises the means of holding the front wheels by a swivel connection to the front axle.

A indicates the front axle, and B indicates the rear axle, which are coupled together by parallel side bars or reach-bars C. The rear axle B is rotary and is mounted in journal-boxes that are secured to the side-bars C or to a frame of which the side-bars form a part. The front axle A, the rear axle B, and the side-bars C C always remain substantially fixed in position with respect to the other.

Provision, if desired, may be made for swivel connections between the reach-rods and the front axle; but that forms no part of the present invention and is not shown or described.

The means for turning the front wheels for the purpose of steering the vehicle consists in means for simultaneously turning each of the said wheels on an axis of its own, which is at right angles to the axle A, but which is not vertical to the horizon, but inclined somewhat thereto, so that as the wheel is turned on its axis the upper part of the rim is thrown in toward the center of the curve along which the wheel is traveling. The wheels assume the inclination in this respect which corresponds to the inclination assumed by a bicycle-wheel, in order to counteract centrifugal force. Another feature is that the angle which the inner wheel takes to the front axles (or to the fore-and-aft axis of the vehicle-body) differs from the angle assumed by the outer wheel. In order to enable the result to be produced, there is employed a peculiarly-made wheel and the hub-mounting. The end $a$ of the axle A extends into the hub $b$ of the wheel and is provided with a bolt or pin connection $b'$, the axis of which is in the normal vertical axis or at right angles to the axis of rotation of the wheel. The wheel itself is made with a concaved hub $c$, having a cavity that lies toward the inside of the wheel and is large enough to furnish room for the end of the axle and the swivel connection between the wheel and the axle, hereinafter described, and is large enough to allow the wheel to rotate freely and to turn on the pin $b'$ freely for the purpose of changing the direction of motion of the vehicle. At the center of the hub $c$ is a shell or hub-box $c'$, that extends in both directions to the outside and to the inside of the wheel, for purposes of construction made in two pieces. The hub C is provided with a tubular projection $c^2$, that extends to the outside of the wheel, and the shell $c'$ is threaded externally to engage with internal threads in the projections $c^2$, and itself extends in the opposite direction to produce a long bearing on the spindle $d$, on which the wheel revolves. The spindle $d$ projects as a branch from a swing-arm D, which may be compared to the half of the fork of a bicycle. At the inner end of the spindle $d$, where it joins the arm D, is a dust-cap $d'$, under which the shell $c'$ engages, and the shell is held on the spindle $d$ by a screw-cap $d^2$. Below the spindle $d$ and parallel with it is a second arm $d^3$, provided at its outer end with a pivot-hole for a pin $b'$. At its upper end the arm D is provided with a pin $d^4$, by means of which it is pivotally connected to a standard E, that rises from the axle A. The standard E is braced by a brace $e$, that extends backward and downward to the reach $c$. The two pins $d^4$ and $b'$ are in axial alinement, and the swing-arm, composed of the two members D and $d^3$, swings freely on the two pins $d^4$ and $b'$, varying the angle between the axle A and the spindle $d$, and as the support E is not vertical to the horizon any variation of the angle between the axle A and the spindle $d$ varies also the angle of the wheel to the vertical position which it has when the spindle is parallel to the axle. If the inner end of the spindle is swung to the rear, its position is lowered with respect to a horizontal plane passing through the vehicle and the upper part of the rim of the wheel is correspondingly brought inward toward the middle line of the vehicle, and as this action takes place when the vehicle is traveling a curve the wheel leans toward the center of the curve. At the same time the opposite wheel, correspondingly turned by a movement of its swing-arm, leans outward from the vehicle, but inward toward the center of the curve that the vehicle is traveling on. The swing-arms of the two wheels are moved simultaneously by a yoke F, to which the steering-handle is fixed. The yoke extends from the swing-arm D to the swing-arm D.

In Figs. 4 and 5 I have shown the arm attachment for a wooden-hub wheel. When used with a wooden or solid hub, the vertical joint on which the arm D' turns is not directly in the vertical axis of the wheel, but is placed nearer the middle of the axle. The arm E' rises from the iron part $A^2$ of the axle. The bent or angled arm D' $d^6$ is held by vertical pin 14 to the end of the axle and passes through bearings in the end of the brace $e'$ and in the upper end of the brace E'. The spindle $D^2$ projects from the arm D', and the hub of the wheel C' is mounted thereon, as in the ordinary way.

What I claim is—

1. In a vehicle running-gear, a swinging arm provided with pins in axial alinement, one of which engages the end of the axle, and the other of which engages an arm rising from the axle, a spindle on the swinging arm parallel with the swivel-arm and adapted to engage the box of the wheel, substantially as described.

2. The combination of an axletree, a wheel having a hollow hub, said axletree extending into the hollow of said hub to a point in a vertical plane through the point of contact of said wheel with the ground, a standard rising from said axletree a distance from the end of the same and extending approximately at the top to a point in said vertical plane, and a bent rod pivoted at the end of the axletree and extending inward, then upward, then outward, and pivoted at the end of said standard, and a hub-spindle secured to said bent rod, substantially as described.

3. In the running-gear of a vehicle, in combination with a front axle, a swinging arm arranged to support the wheel-hub and provided with pins in axial alinement on which it turns, one of said pins being inside the hub and the other outside the rim of the hub, substantially as described.

4. In combination with the front axletree, an arm secured to the end thereof by a vertical pin, a brace supporting the upper end of said arm, a spindle carried by said arm, having its inner end carried by said arm and arranged to swing with said arm to an angle with the longitudinal axis of the axletree, substantially as described.

In testimony whereof I sign this specification in the presence of two witnesses.

HENRY W. KOEHLER.

Witnesses:
CHARLES F. BURTON,
MAY E. KOTT.